(12) United States Patent
Cherubini et al.

(10) Patent No.: US 7,864,487 B2
(45) Date of Patent: Jan. 4, 2011

(54) HEAD DESIGN FOR WRITING SERVO PATTERNS ON MAGNETIC TAPE

(75) Inventors: Giovanni Cherubini, Rueschlikon (CH);
Roy D. Cideciyan, Rueschlikon (CH);
Evangelos S. Eleftheriou, Rueschlikon (CH); Jens Jelitto, Rueschlikon (CH);
Mark A. Lantz, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/118,251

(22) Filed: May 9, 2008

(65) Prior Publication Data

US 2009/0279202 A1    Nov. 12, 2009

(51) Int. Cl.
*G11B 5/584* (2006.01)
*G11B 5/265* (2006.01)

(52) U.S. Cl. .................. 360/77.12; 360/121; 360/48
(58) Field of Classification Search .................. None
See application file for complete search history.

(56) References Cited

U.S. PATENT DOCUMENTS

| | | | |
|---|---|---|---|
| 5,689,384 A | 11/1997 | Albrecht et al. | |
| 5,930,065 A | 7/1999 | Albrecht et al. | |
| 6,021,013 A | 2/2000 | Albrecht et al. | |
| 6,141,174 A | 10/2000 | Judge et al. | |
| 6,169,640 B1 * | 1/2001 | Fasen | 360/48 |
| 6,282,051 B1 | 8/2001 | Albrecht et al. | |
| 6,542,235 B1 | 4/2003 | Caskey et al. | |
| 6,842,305 B2 | 1/2005 | Mosltad et al. | |
| 6,879,457 B2 | 4/2005 | Eaton et al. | |
| 7,529,061 B2 * | 5/2009 | Bui et al. | 360/77.12 |
| 2003/0151844 A1 | 8/2003 | Eaton et al. | |
| 2005/0030661 A1 | 2/2005 | Bui et al. | |
| 2005/0073763 A1 * | 4/2005 | Molstad et al. | 360/51 |
| 2005/0259364 A1 * | 11/2005 | Yip | 360/241.1 |
| 2006/0066976 A1 | 3/2006 | Ohtsu | |
| 2009/0040643 A1 * | 2/2009 | Weng et al. | 360/55 |

FOREIGN PATENT DOCUMENTS

| | | |
|---|---|---|
| EP | 0 940 812 A2 | 9/1999 |
| EP | 1 204 096 A2 | 5/2002 |
| EP | 1 600 967 A2 | 11/2005 |

OTHER PUBLICATIONS

Giovanni Cherubini et al.; "Servo Channel for Tape Drive Systems"; U.S. Appl. No. 11/969,184, filed Jan. 3, 2008.
International Search Report for PCT Serial No. PCT/IB2009/051882 dated Jun. 11, 2009.

* cited by examiner

*Primary Examiner*—Andrew L Sniezek
(74) *Attorney, Agent, or Firm*—Cantor Colburn LLP; Stephen Kaufman (57) ABSTRACT

A servo write head is provided and is configured to simultaneously write at least two servo patterns in respective servo bands on linear magnetic tape. Centerlines of the servo patterns are substantially uniformly spaced in the lateral direction. In addition, the servo patterns of all adjacent respective servo bands are displaced relative to each other in a longitudinal direction by an amount that is related to a length of a servo frame and a type of the servo patterns.

22 Claims, 11 Drawing Sheets

HEAD DESIGN FOR WRITING SERVO PATTERNS ON MAGNETIC TAPE

BACKGROUND OF THE INVENTION

1. Field of the Invention

Aspects of the present invention are directed to a servo write head design and, more particularly, to a servo write head design for writing servo patterns on magnetic tape.

2. Description of the Background

In tape drive systems that adopt timing-based servo (TBS) control, recorded servo patterns consist of transitions with two different azimuthal slopes. Servo reader head position (e.g., y-position or a y-estimate thereof) is derived from the relative timing of pulses generated by a servo reader or, in some cases, two or more servo readers. The servo reader(s) reads the servo patterns during read/write operations of the tape drive systems. TBS patterns also allow for the encoding of longitudinal position (LPOS) information without affecting the generation of the transversal position error signal (PES).

Figure 1:
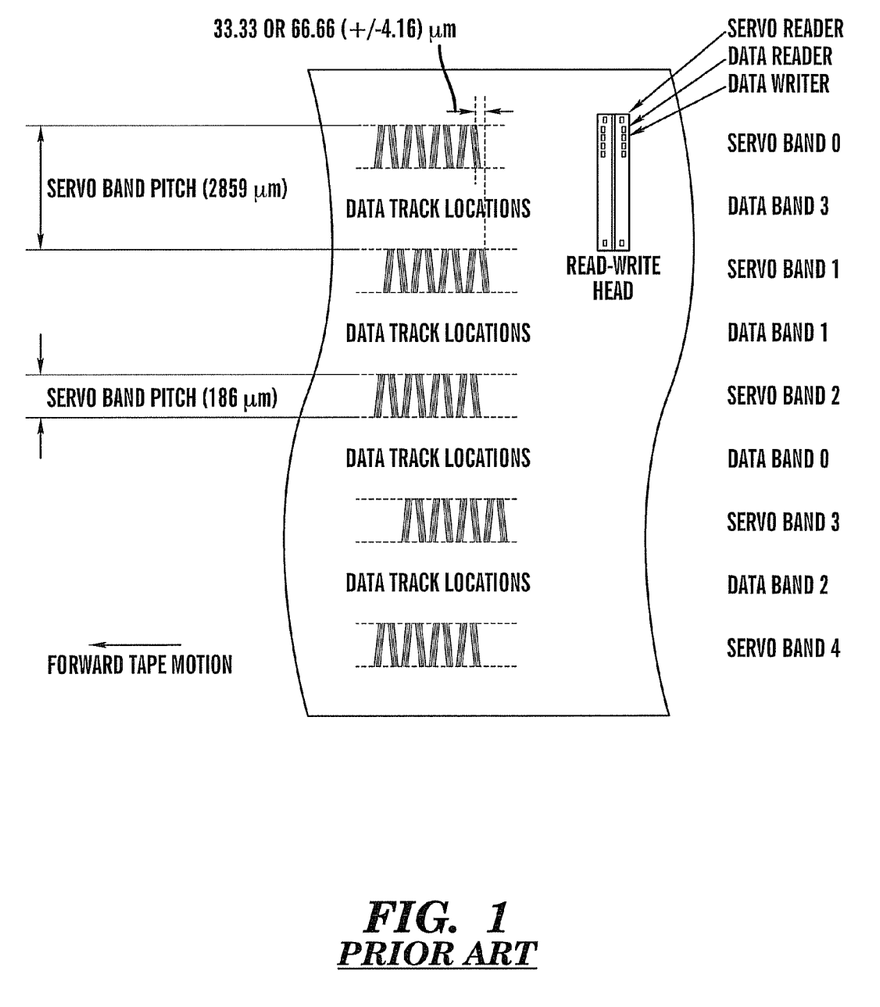
FIG. 1 is a schematic illustration of servo patterns positioned in accordance with a linear tape-open (LTO) format.

The servo patterns may be positioned in multiple servo bands, as specified in the linear tape-open (LTO) format, an example of which is shown in FIG. 1. The complete format for LTO drives of generation 1 (LTO-1) was standardized by the European Computer Manufacturers Association (ECMA) in 2001 as ECMA-319. Additional information on LTO technology, such as particular information on LTO drives of generations 2 to 4 (LTO-2 to LTO-4), where the servo format was not modified, can be readily found on the Internet.

As shown in FIG. 1, the servo patterns written by servo writer heads may be organized into 5 servo bands or, alternately, other numbers of servo bands. Where the servo patterns are organized into 5 servo bands, each servo band may have a servo band pitch of 2,859 µm and a servo band width of 186 µm. Data is stored in regions of the magnetic tape disposed in between the servo bands. Writing/reading of the information to/from the data tracks on the magnetic tape is performed by the data writers and readers that are located in the read-write head. In addition, the relative position of servo patterns in two adjacent servo bands in the longitudinal direction is defined by the LTO standard, which specifies a relative displacement of 33.33 or 66.66 µm, with a tolerance of +/−4.16 µm, between adjacent servo bands. The specified relative displacement of the servo patterns in different servo bands is introduced to allow for the rapid identification of the servo bands.

In all tape drive products, track-following and reel-to-reel servomechanisms rely on the generation of y-estimates and velocity estimates that describe a velocity of the tape and a position of a servo reader, which is also located in the read-write head, that generates signals from which the y-estimates and the velocity estimates are obtained. Thus, for proper operation of the servo control systems, a relatively high and relatively highly uniform rate of y-estimate generation, PES generation and velocity estimate generation is of great importance in determining a bandwidth of the servo systems. In conventional tape drive products, however, the uniform rate of y-estimate generation, PES generation and velocity estimate generation is limited to two estimates every servo frame.

SUMMARY OF THE INVENTION

In accordance with an aspect of the invention, a servo write head configured to simultaneously write at least two servo patterns in respective servo bands on linear magnetic tape, where centerlines of the servo patterns are substantially uniformly spaced in the lateral direction, and where the servo patterns of all adjacent respective servo bands are displaced relative to each other in a longitudinal direction by an amount that is related to a length of a servo frame and a type of the servo patterns.

In accordance with another aspect of the invention, servo control system for use in reading information from the servo pattern written on linear magnetic tape, and for use in writing data to and reading data from linear magnetic tape is provided and includes a read-write head configured to simultaneously read at least two servo patterns in servo bands on the magnetic tape, where centerlines of the servo patterns are substantially uniformly spaced in a lateral direction, and where the servo patterns of all adjacent respective servo bands are displaced relative to each other in a longitudinal direction by an amount that is related to a length of a servo frame and a type of the servo patterns, and at least two parallel servo channels for processing readback servo signals obtained from at least two servo readers reading the servo patterns, wherein a measure of a servo frame interval with a zero-value time delay is employed for a computation of y-estimates for use in servo control of the read-write head.

In accordance with another aspect of the invention, a system is provided including at least one servo pattern write head including a yoke of ferromagnetic material, a coil, to which current is applied, wrapped around a portion of the yoke to generate a magnetic flux therein, and a tape-bearing portion of a housing into which the at least one yoke extends, including gaps through which the magnetic flux generated in the yoke extends, the gaps being arranged such that the magnetic flux is configured to simultaneously write at least two servo patterns in respective servo bands with centerlines of the servo patterns being substantially uniformly spaced in a lateral direction, and with the servo patterns of all adjacent respective servo bands being displaced relative to each other in a longitudinal direction by an amount that is related to a length of a servo frame and a type of the servo patterns, wherein the system further includes a magnetic recording medium, to which servo information is written by the servo write head, disposed proximate to the tape, and a controller, electrically coupled to the servo write head, which is configured to control the writing of the servo information to the magnetic recording medium.

BRIEF DESCRIPTIONS OF THE DRAWINGS

The subject matter regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

DETAILED DESCRIPTION OF THE INVENTION

In accordance with embodiments of the present invention, a servo write head is provided that is configured to write servo patterns onto magnetic recording media, which lead to y-estimates, position error signals (PES) and velocity estimates that are independent of written-in velocity errors and which are generated at a uniform rate that exceeds the rate that may be obtained by conventional formats.

Figure 2A:
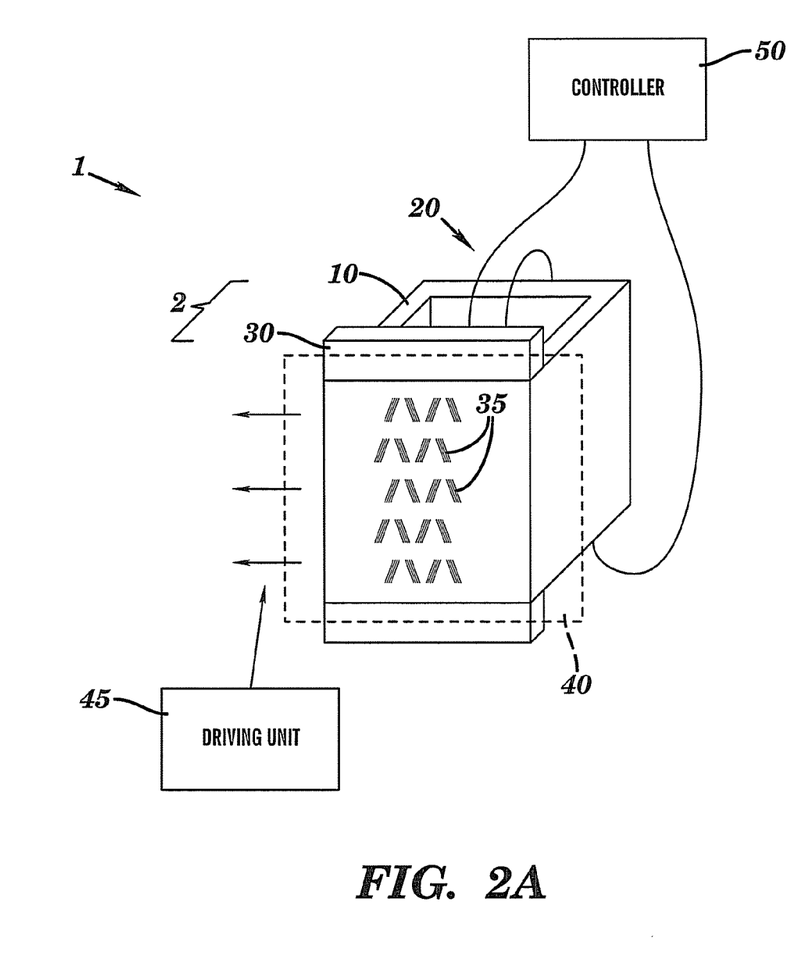
FIGS. 2A, 2B and 2C are schematic perspective views of a system including a servo write head in accordance with embodiments of the present invention.

With reference to FIG. 2A, an exemplary embodiment of a system 1 is illustrated as including a servo write head 2 that is configured according to the embodiments of the present invention. The servo write head 2 includes a yoke 10 of ferromagnetic material and a coil 20, to which a current is applied, and which is wrapped around a portion of the yoke 10 to thereby generate a magnetic flux in the yoke 10. The servo write head 2 further includes a tape-bearing portion 30 of a housing into which the yoke extends to form a part of the tape bearing portion. The servo write head 2 further includes gaps in the tape bearing portion of the yoke 35 through which the magnetic flux generated in the yoke 10 extends. The gaps 35 are arranged with respect to one another such that the magnetic flux is configured to simultaneously write at least two servo patterns in respective servo bands onto a magnetic recording medium 40, such as linear magnetic tape. The servo patterns are at least partly characterized in that centerlines of the servo patterns are substantially uniformly spaced in a lateral direction, and in that the servo patterns of all adjacent respective servo bands are displaced relative to each other in a longitudinal direction by an amount that is related to a length of a servo frame and a type of the servo patterns.

Figure 2B:
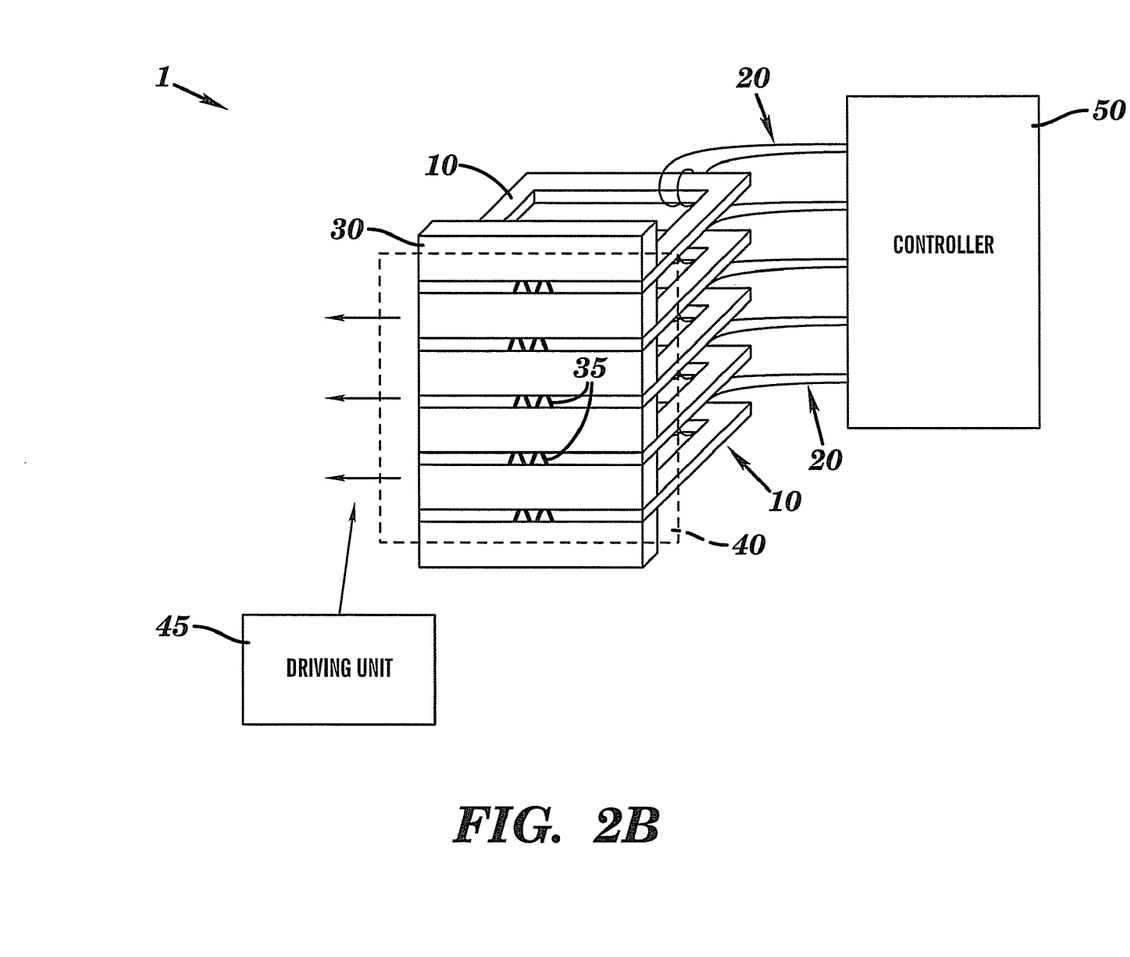

With reference to FIG. 2B, a second exemplary embodiment of system 1 is illustrated as including a servo write head 2 that is configured according to the embodiments of the present invention. The servo write head 2 includes at least two yokes 10 of ferromagnetic material and at least two coils 20, to which a current is applied, and which are wrapped around a portion of the yokes 10 to thereby generate a magnetic flux in the yokes 10. The servo write head 2 further includes a tape-bearing portion 30 of a housing into which the yokes extend to form a part of the tape bearing portion. The servo write head 2 further includes gaps in the tape bearing portion of the yokes 35 through which the magnetic flux generated in the yokes 10 extends. The gaps 35 are arranged with respect to one another such that the magnetic flux is configured to simultaneously write at least two servo patterns in respective servo bands onto a magnetic recording medium 40, such as linear magnetic tape. The gaps are at least partly characterized in that centerlines of the gaps are substantially uniformly spaced in a lateral direction, and in that the gaps are displaced relative to each other in a longitudinal direction by an amount that is related to a length of a servo frame and a type of the servo patterns. As such the servo patterns are also at least partly characterized in that centerlines of the servo patterns are substantially uniformly spaced in a lateral direction, and in that the servo patterns of all adjacent respective servo bands are displaced relative to each other in a longitudinal direction by an amount that is related to a length of a servo frame and a type of the servo patterns.

Figure 2C:
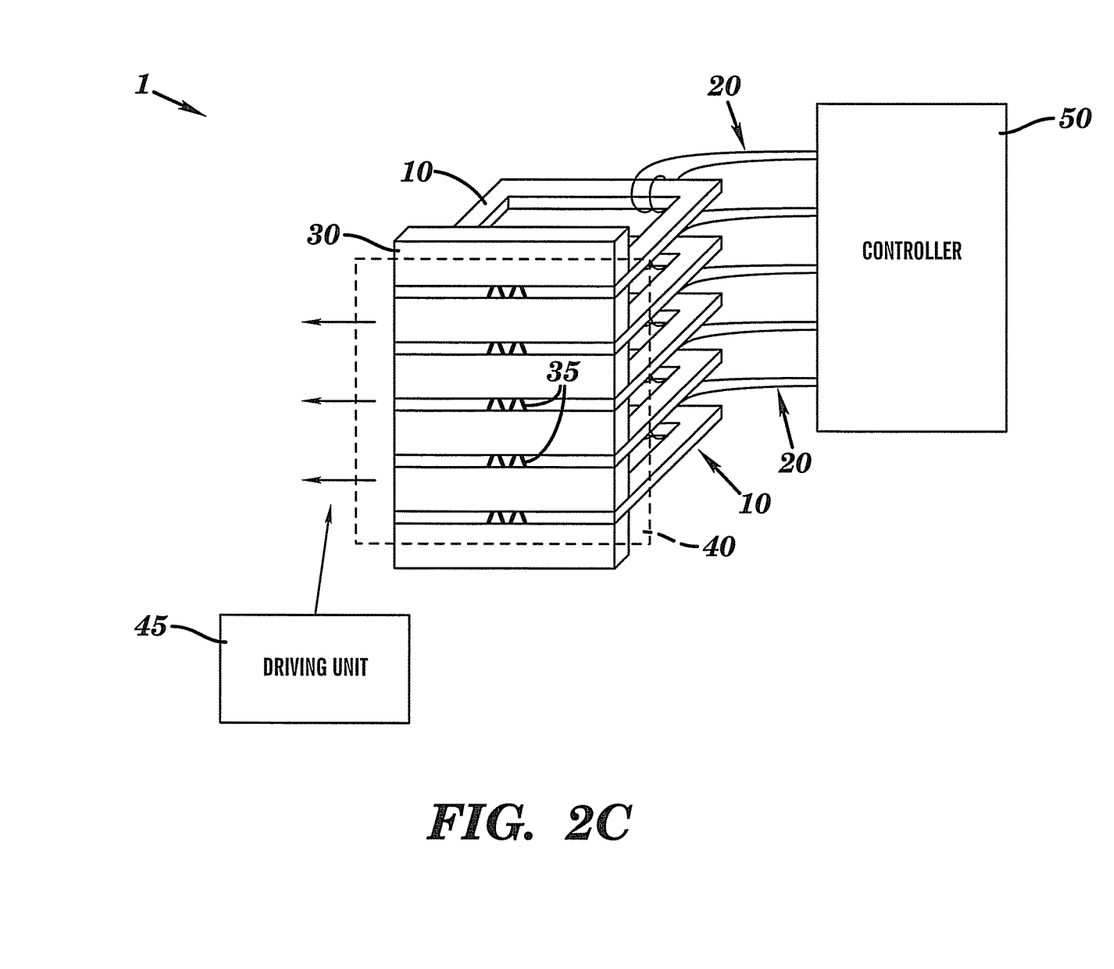

With reference to FIG. 2C, a third exemplary embodiment of system 1 is illustrated as including a servo write head 2 that is configured according to the embodiments of the present invention. The servo write head 2 includes at least two yokes 10 of ferromagnetic material and at least two coils 20, to which a current is applied, and which are wrapped around a portion of the yokes 10 to thereby generate a magnetic flux in the yokes 10. The servo write head 2 further includes a tape-bearing portion 30 of a housing into which the yokes extend to form a part of the tape bearing portion. The servo write head 2 further includes gaps in the tape bearing portion of the yokes 35 through which the magnetic flux generated in the yoke 10 extends. The gaps 35 are arranged with respect to one another such that the magnetic flux is configured to write at least two servo patterns in respective servo bands onto a magnetic recording medium 40, such as linear magnetic tape. The gaps are at least partly characterized in that centerlines of the gaps are substantially uniformly spaced in a lateral direction, and in that the gaps are aligned relative to each other in a longitudinal direction. The desired longitudinal displacement of the servo patterns is obtained by controlling the timing of application of the current pulses to the at least two coils 20. As such, the servo patterns are also at least partly characterized in that centerlines of the servo patterns are substantially uniformly spaced in a lateral direction, and in that the servo patterns are aligned relative to each other in a longitudinal direction.

The magnetic recording medium 40, which may include linear magnetic tape, may be disposed proximate the servo write head 2 and may be driven by a driving unit 45 to move in a transverse direction relative to a plane of the tape-bearing portion 30 of the housing of the servo write head 2. In this configuration, the servo write head 2 is configured to write servo patterns to the magnetic recording medium 40 as the magnetic recording medium 40 is driven relative to the tape-bearing portion 30. A controller 50 is electrically coupled to the at least one coil 20, and is configured to control the writing of the servo patterns to the magnetic recording medium 40 by the servo write head 2, by generating current pulses applied to the at least one coil 20 at the appropriate time instants.

Figure 3A:
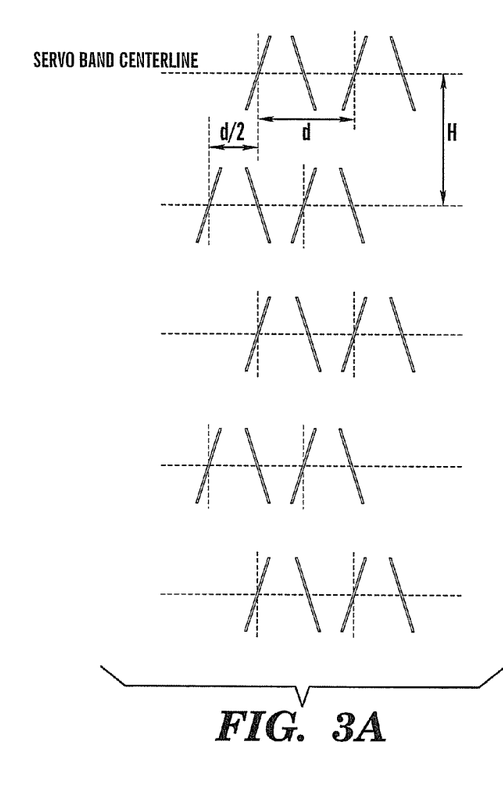
FIGS. 3A and 3B are illustrations of M-shaped servo patterns written by a servo write head in accordance with embodiments of the present invention.
Figure 3B:
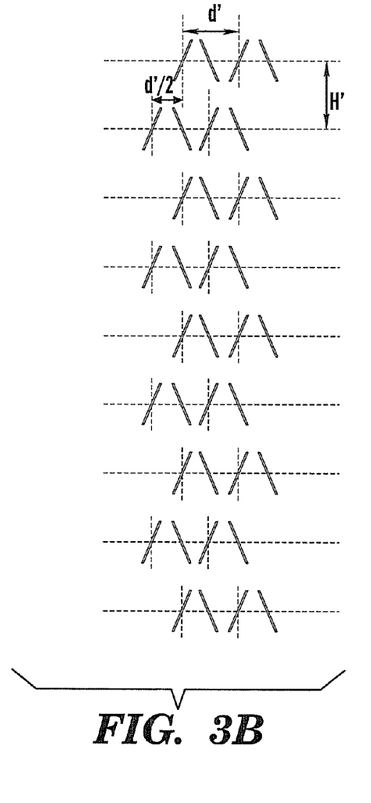
Figure 8:
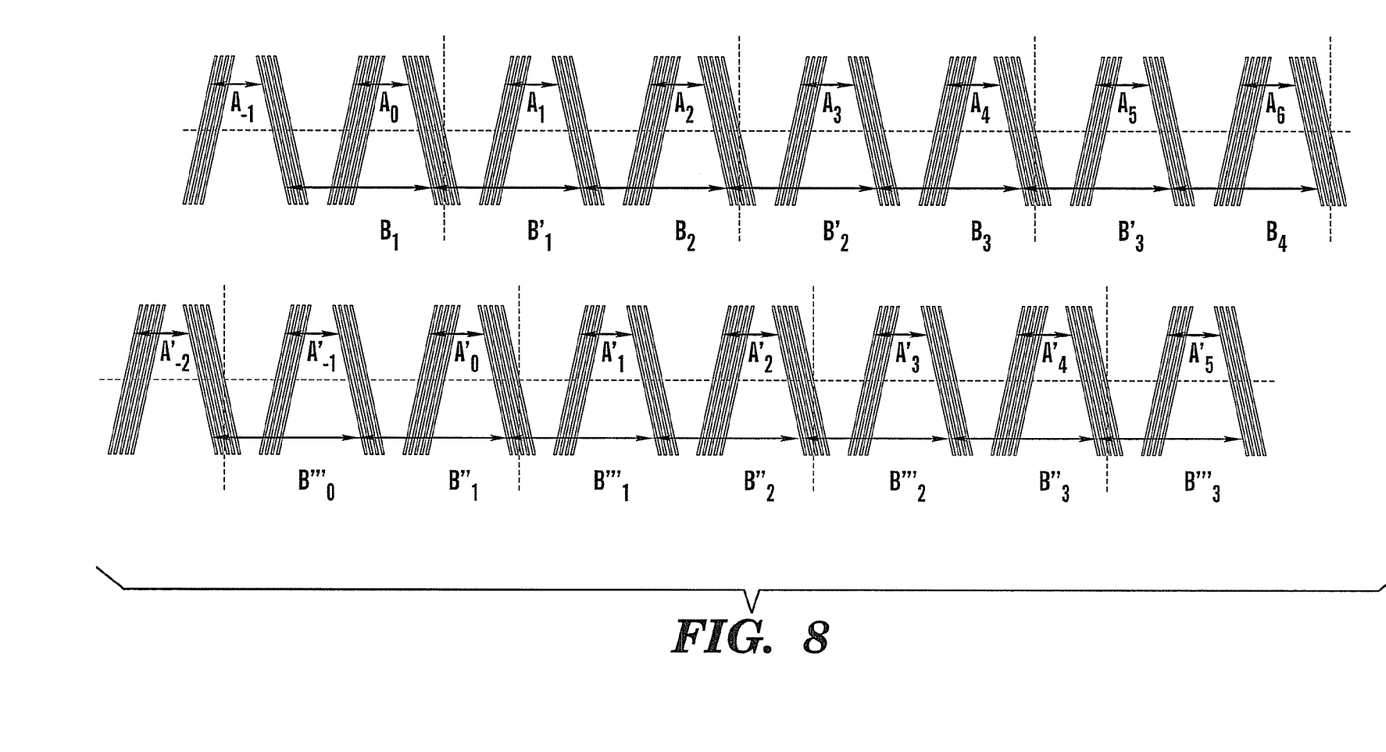
FIG. 8 is an illustration of data employed in the computation of y-estimates that are independent of written-in velocity errors for M-shaped servo patterns.

As shown in FIGS. 3A and 3B, where H and H' represent distances between respective servo band centerlines, the servo write head 2 may be configured to generate M-shaped servo patterns over 5, 9 or another suitable number (e.g., 7) of servo bands simultaneously. Here, the servo write head 2 may be an M-shaped servo pattern writer or a V-shaped servo pattern writer that is used twice for each M-shaped servo pattern. An M-shaped servo pattern may be characterized by a length d, d' between pattern transitions that are oriented with the same azimuth (see FIGS. 3A and 3B), such as an azimuth having an absolute value of 6 degrees or an azimuth with a range of absolute values of 6 to 24 degrees. Further, as shown in FIG. 8, the generated M-shaped servo pattern allows for two lateral position estimates per servo frame to be obtained. Therefore, in order to obtain a highest rate of lateral position estimates for M-shaped servo patterns, since a frame length of an M-shaped servo pattern is 2d, 2d' (see FIG. 8), the optimal relative displacement between adjacent servo bands for M-shaped servo patterns is one quarter of the frame length or d12, d'/2.

Figure 4A:
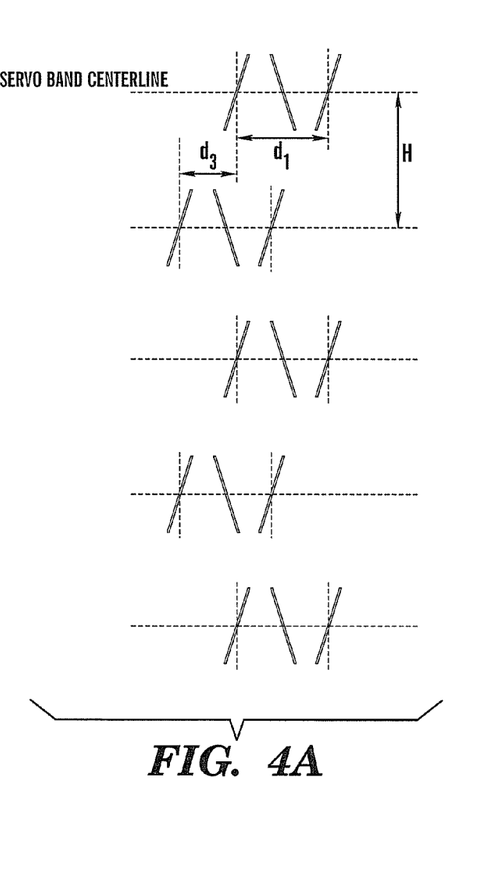
FIGS. 4A and 4B are illustrations of N-shaped servo patterns written by a servo write head in accordance with embodiments of the present invention.
Figure 4B:
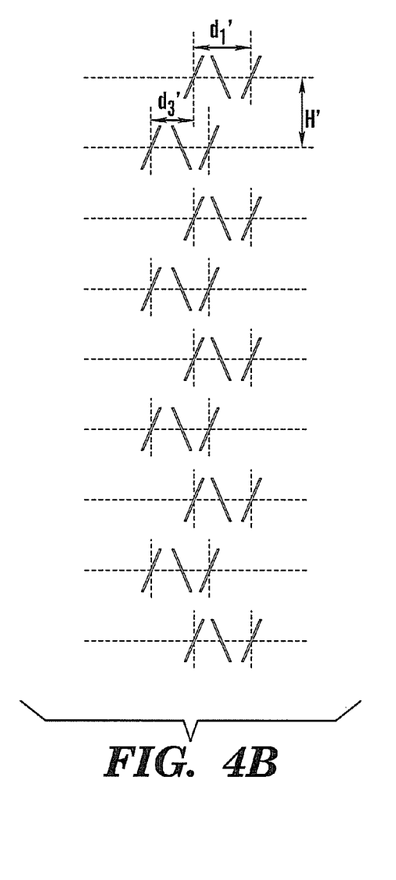
Figure 9:
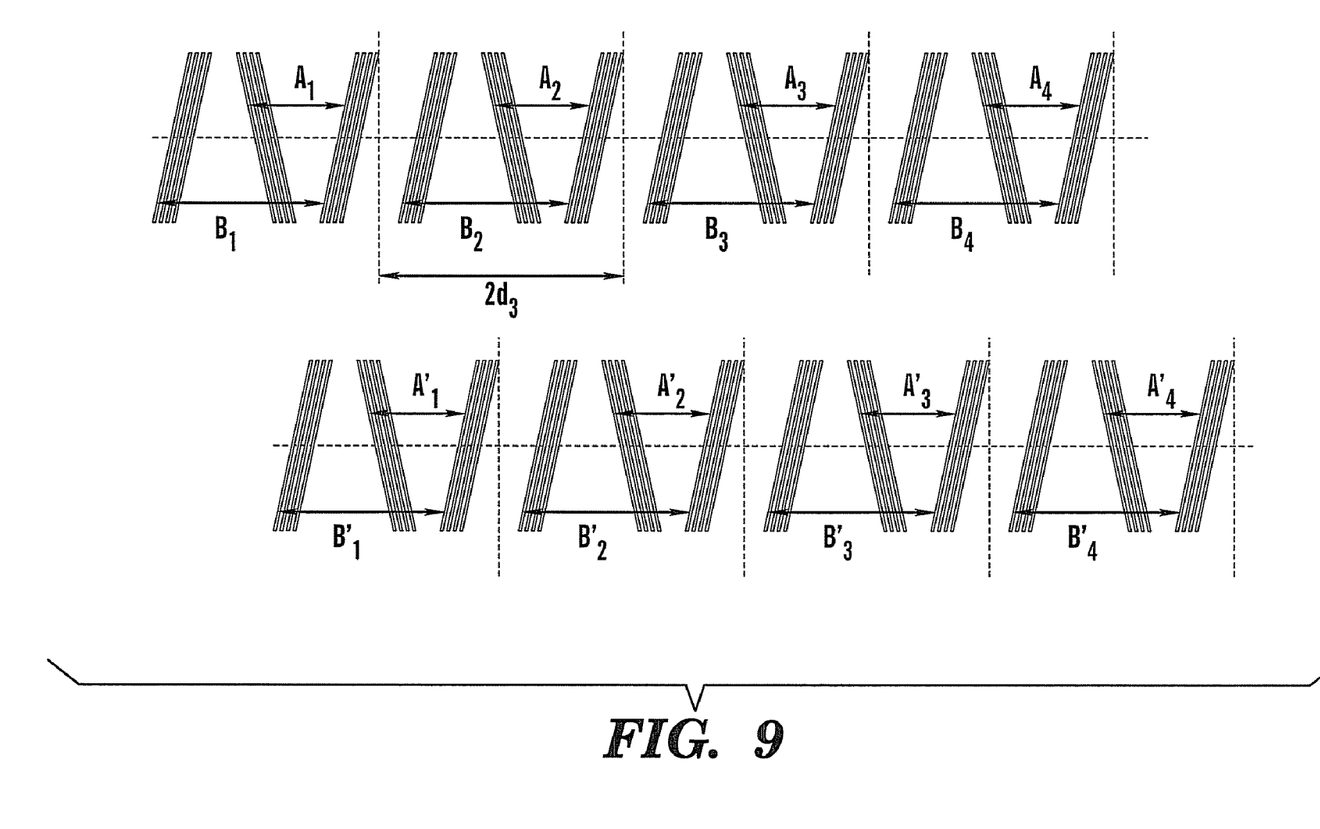
FIG. 9 is an illustration of data employed in the computation of y-estimates that are independent of written-in velocity errors for N-shaped servo patterns.

Similarly, as shown in FIGS. 4A and 4B, the servo write head 2 may be configured as an N-shaped servo writer to generate N-shaped servo patterns over 5, 9 or another suitable number (e.g., 7) of servo bands simultaneously. An N-shaped servo pattern may be characterized by a length d1, d1' between pattern transitions that are oriented with the same azimuth (see FIGS. 4A and 4B), such as an azimuth having an absolute value of 6 degrees or an azimuth with a range of absolute values of 6 to 24 degrees. As shown in FIG. 9, the generated N-shaped servo pattern allows for one lateral position estimate per servo frame to be obtained. Therefore, in order to obtain a highest rate of lateral position estimates for N-shaped servo patterns, since a frame length of an N-shaped servo pattern is 2d3, 2d3' (see FIG. 9), the optimal relative displacement for N-shaped servo patterns is one half of the frame length or d3, d3'.

Figure 5A:
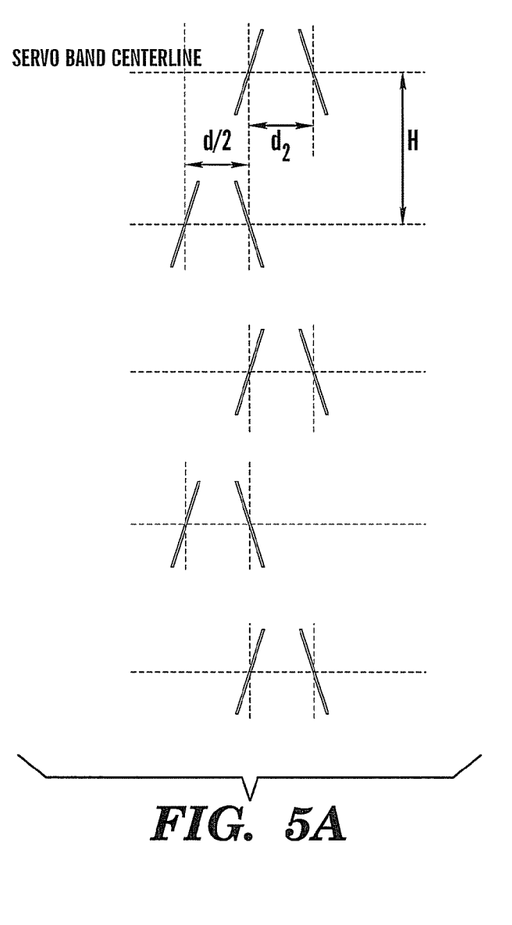
FIGS. 5A and 5B are illustrations of V-shaped servo patterns written by a servo write head in accordance with embodiments of the present invention.
Figure 5B:
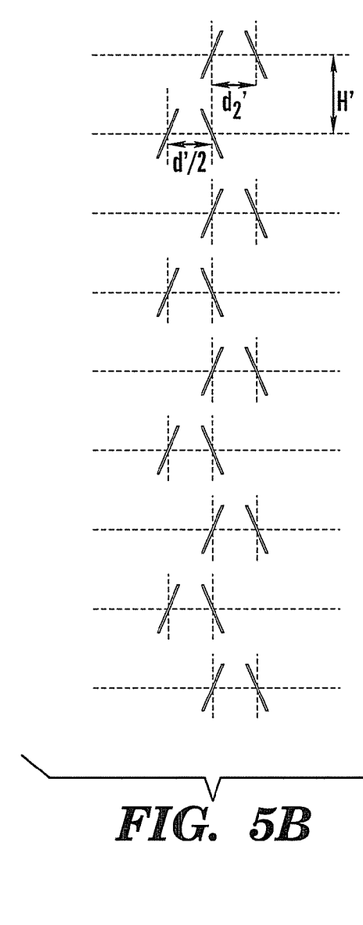

Finally, as shown in FIGS. 5A and 5B, the servo write head 2 may be configured as a V-shaped servo writer to generate V-shaped servo patterns over 5, 9 or another suitable number (e.g., 7) of servo bands simultaneously. A V-shaped servo writer is used twice to generate an M-shaped servo pattern. To obtain a highest rate of lateral position estimates for servo patterns that are generated by a V-shaped servo writer, since a frame length of a V-shaped servo pattern is the same as an M-shaped servo pattern, i.e., 2d, 2d', the optimal relative displacement for V-shaped servo patterns is also d/2, d'/2.

Figure 6:
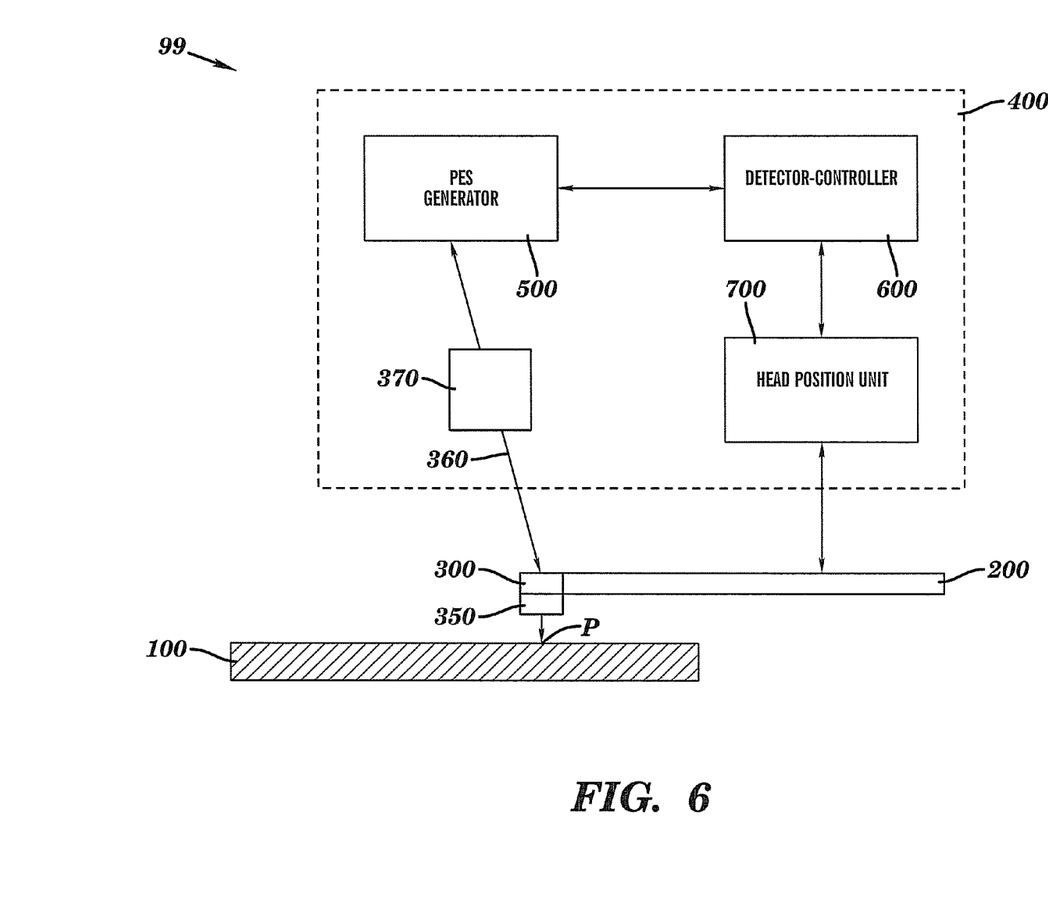
FIG. 6 is a schematic view of a system for improving position error signal (PES) quality in accordance with an embodiment of the invention.

With reference to FIGS. 1 and 6, in linear tape drives employing timing-based servo (TBS) technology, information is read from and/or is written to linear magnetic tape by a read-write head 300, including at least one servo reader 350, which moves with respect to the linear tape and which is positioned relative to the linear tape in accordance with a servo control signal that is responsive to a position error signal (PES). The quality of the PES is inversely proportional to a standard deviation of the PES.

Accordingly, a system 99 is provided that reduces the standard deviation of the PES and which thereby improves the quality of the PES. As shown in FIG. 6, the system 99 includes a substrate 100, such as a recording surface of the magnetic linear tape, on which the servo pattern P is provided. An actuator 200, including a read-write head 300 is disposed proximate the linear tape. The read-write head 300 includes at least two servo readers 350 which detect the servo pattern P in accordance with methods well known in the art. The actuator 200 positions the read-write head 300 proximate the servo pattern P in accordance with the detected servo pattern P and servo control algorithms which are also well known in the art.

Controller 400 executes the servo control algorithms and may be a computing system and/or may be embodied as computer readable media having stored executable instructions for carrying out the servo control algorithms. In any case, the controller 400 may include a PES generator 500, which generates the PES from the detected servo pattern P, a detector-controller 600, which analyzes the PES and thereby determines whether the read-write head 300 needs to be repositioned with respect to the servo pattern P, and a head position unit 700. The head position unit 700 generates servo control signals that cause the actuator 200 to move the read-write head 300 in accordance with the determinations of the detector-controller 600.

The at least two servo readers 350 may be coupled to a synchronous servo channel 360 that employs a matched-filter interpolator/correlator 370. The matched-filter interpolator/correlator 370 provides for signal filtering at both a constant linear tape velocity relative to the at least two servo readers 350 and during acceleration and deceleration of the linear tape relative to the at least two servo readers 350. The synchronous servo channel thus provides for the generation of y-estimates and linear tape velocity estimates, which are each employed in the servo control of the read-write head 300 and which will be described below.

In accordance with the invention, the linear tape is spooled/unspooled by, e.g., magnetic tape reels, and passes by the at least two servo readers 350 of the read-write head 300 during read/write operations such that the at least two servo readers 350 moves relative to the recording surface of the linear tape. The servo patterns P also allow for the encoding of longitudinal position (LPOS) information by shifting transitions from their nominal pattern position. The servo pattern P is recorded on the linear tape for the purpose of providing for a generation of the servo control signal that maintains the read-write head 300 in proper read/write positions.

Figure 7:
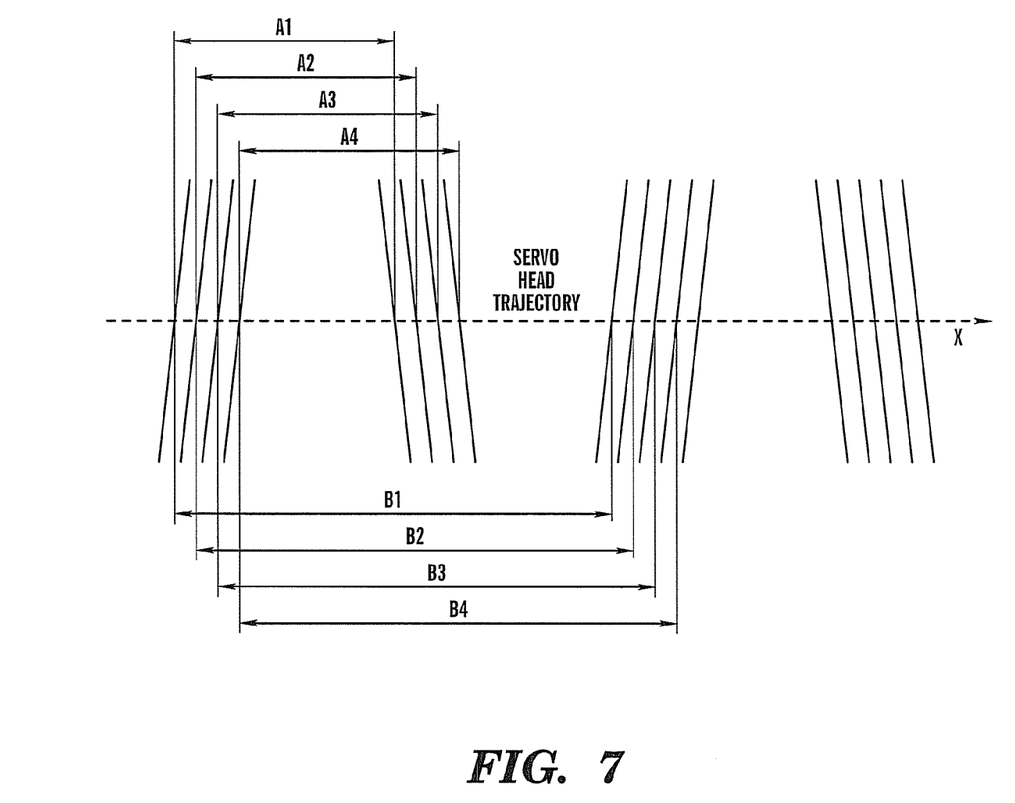
FIG. 7 is an illustration of intervals for use in the computation of tape velocity and y-position estimates.

A computation method for the lateral position estimates or, more particularly, the y-estimates, will now be discussed. With reference to FIG. 7, the distance between servo bursts of the various servo patterns, which may be obtained by employing a measurement of the time interval between peak arrival times of pulses of servo control signals, is considered for the computation of the tape velocity and the y-estimates, as shown. In particular, a y-estimate in an LTO tape drive is given by the expression:

$$y_{est} = -1/2 \tan(\pi/30)*((A1+A2+A3+A4)/(B1+B2+B3+B4)-50/1)$$

where $1=100$ μm for forward tape motion and $1=95$ μm for reverse tape motion.

In accordance with the various embodiments of the present invention, with respect to the computation of the y-estimates, as discussed above, three further aspects are considered. First, it is desirable to avoid written-in velocity errors. Written-in velocity errors arise from the inevitable velocity variations that occur when servo patterns are written. Such errors occur whenever time intervals are measured between pulses of servo control signals that are obtained from magnetic transitions in servo patterns that have not been written simultaneously. For example, the y-estimate obtained as shown in FIG. 7 is independent of written-in velocity errors provided that the servo patterns are written using a servo writer designed for an M-shaped servo pattern, as opposed to a servo writer designed for a V-shaped servo pattern that is used twice. Second, it is necessary to maximize the uniform rate at which y-estimates are generated, as this rate is determinative of a bandwidth of the track-following servo controls. Third, it is necessary to minimize the delays that are introduced in the y-estimate computation. That is, computational delays adversely affect the quality of y-estimates and the phase margin of the track-following servo controls. For example and with reference to FIG. 7, a delay is introduced between the completion of the "A" intervals and that of the "B" intervals. To avoid such a delay, the "A" and "B" intervals should be determined with consideration for the same final transition.

As such, it is noted that FIG. 8 illustrates an exemplary y-estimate computation in accordance with an embodiment of the present invention. Here, the computation uses M-shaped servo patterns and two servo readers and is independent of written-in velocity errors. As shown, since one frame within a servo band comprises a sequence of [4 4 5 5] servo bursts, two equally spaced y-estimates are obtained per servo frame, and four equally spaced y-estimates are obtained within the length of a servo frame from the two parallel servo channels. This result corresponds to twice the rate achieved by current LTO tape drives, provided the relative displacement between adjacent servo bands is d/2, d'/2, as discussed above with reference to FIGS. 3A and 3B.

In detail, in FIG. 8, the intervals in the top servo band that are measured independently of written-in velocity errors are intervals $A_{-1}$ to $A_6$ and $B_1$, $B_2$, $B_3$ and $B_4$ while the intervals in the bottom servo band that are measured independently of written-in velocity errors are the intervals $A'_{-2}$ to $A'_5$ and $B''_1$, $B''_2$ and $B''_3$. Conversely, the intervals in the top servo band that do not possess such characteristics are intervals $B'_1$, $B'_2$ and $B'_3$ while the intervals in the bottom servo band that do not possess such characteristics are intervals $B'''_0$, $B'''_1$, $B'''_2$ and $B'''_3$. That is, estimates that are independent of written-in velocity errors are obtained by observing that every "A" interval measurement, and only every second "B" interval measurement, are written-in error independent. With this in mind, the sequence of y-estimates is given by:

$$A_0/B_1, A'_0/B''_1, A_1/B_1, A'_1/B''_1, A_2/B_2, A'_2/B''_2, A_3/B_2, A'_3/B''_2, \ldots$$

Here, it is noted that, in order to reduce the delay in the "B" terms that are used for the generation of y-estimates, it is possible to replace a delayed "B" interval measurement from a channel associated with one servo band with a more recent "B" interval measurement from the other channel associated with the other servo band. With reference to FIG. 8, the sequence of y-estimates, in this case, becomes:

$$A_0/B_1, A'_0/B''_1, A_1/B''_1, A'_1/B''_1, A_2/B_2, A'_2/B''_2, A_3/B''_2, A'_3/B''_2, \ldots$$

It is further noted that FIG. 9 illustrates an exemplary y-estimate computation in accordance with an embodiment of the present invention, which is independent of written-in velocity errors, using N-shaped servo patterns and two servo readers. As shown, each interval in FIG. 9 is written-in error independent. Further, as shown, since one frame within a servo band comprises a sequence of [4 4 4] servo bursts, one y-estimate is obtained per servo frame, and two equally spaced estimates are obtained within the length of a servo frame from the two parallel servo channels, provided the relative displacement between adjacent servo bands is chosen to be $d_3$, $d_3'$, as discussed above with reference to FIGS. 4A and 4B.

The uniform rate of y-estimate generation is, thus, doubled as compared to tape drive systems without relative displacement of servo patterns by half of the servo frame length, and the sequence of y-estimates is given by:

$$A_1/B_1, A'_1/B'_1, A_2/B_2, A'_2/B'_2, A_3/B_3, A'_3/B'_3, A_4/B_4, A'_4/B'_4, \ldots$$

With respect to V-shaped servo patterns, where two servo readers are used, it is noted that written-in independent y-estimate computation cannot be achieved unless time intervals are computed between arrival times of servo control signal pulses that are generated from transitions in adjacent servo bands. This approach to obtain written-in independent y-estimates, however, is not desirable in practice since measurements required to estimate equivalent "B" intervals would tend to exhibit 3 dB worse signal-to-noise ratio as compared to estimates from M-shaped servo patterns. With that said, using a write head design for writing staggered V-shaped servo patterns would nevertheless allow for a doubling of the rate of generation of y-estimates as compared to current LTO tape drives, with zero delay in the "B" intervals.

In accordance with another aspect of the invention, it is noted that the servo write head 2 may be further configured to encode servo band ID information in a reserved field of the longitudinal position (LPOS) word.

With reference to FIG. 6, in accordance with another aspect of the invention, the system 1 may comprise a servo control system, which includes at least two parallel servo channels 360 for processing readback servo signals obtained from the servo patterns. Here, at least four y-estimates may be obtained per servo frame and a measure of a servo frame interval with a zero-value time delay is employed for a computation of the y-estimates.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular exemplary embodiment disclosed as the best mode contemplated for carrying out this disclosure, but that the disclosure will include all embodiments falling within the scope of the appended claims.

We claim:

1. A servo write head configured to simultaneously write a same one of a first or a second single servo pattern in respective servo bands on linear magnetic tape, where centerlines of the servo pattern of each of the servo bands are substantially uniformly spaced in the lateral direction and where the respective servo patterns of all adjacent servo bands are displaced relative to each other in a longitudinal direction by a fraction of a length of a servo frame of the same one of the first or the second servo pattern, the fraction being set in accordance with a type of the same one of the first or the second servo pattern and the fraction set for and a displacement of the first servo pattern being different from the fraction set for and a displacement of the second servo pattern.

2. The servo head according to claim 1, wherein the first or the second servo pattern comprises an M-shaped servo pattern.

3. The servo head according to claim 1, wherein the first or the second servo pattern comprises an N-shaped servo patterns.

4. The servo head according to claim 1, wherein the first or the second servo pattern comprises a V-shaped servo patterns.

5. The servo head according to claim 1, wherein a number of the respective servo bands is five.

6. The servo head according to claim 1, wherein a number of the respective servo bands is seven.

7. The servo head according to claim 1, wherein a number of the respective servo bands is nine.

8. The servo head according to claim 1, wherein the servo first or the second pattern is oriented with an absolute value of an azimuth of 6 degrees from to the lateral direction.

9. The servo head according to claim 1, wherein the first or the second servo pattern is oriented with an absolute value of an azimuth that is greater than 6 degrees but less than 24 degrees from to the lateral direction.

10. A servo control system for use in reading information from the servo pattern written on linear magnetic tape, and for use in writing data to and reading data from linear magnetic tape, the system comprising:

a read-write head configured to simultaneously read a same one of a first or a second single servo pattern in servo bands on the magnetic tape, where centerlines of the servo pattern of each of the servo bands are substantially uniformly spaced in the lateral direction and where the respective servo pattern of all adjacent servo bands are displaced relative to each other in a longitudinal direction by one of a first or a second fraction of a length of a servo frame of the same one of the first or the second servo pattern, the first fraction being set in accordance with a type of the first servo pattern and the second fraction being set in accordance with a type of the second servo pattern such that a displacement of the first servo pattern is different from a displacement of the second servo pattern; and at least two parallel servo channels for processing readback servo signals obtained from at least two servo readers reading the servo pattern of each of the servo bands enable a computation of y-estimates for use in servo control of the read-write head.

11. The system according to claim 10, wherein the two parallel servo channels are further configured to decode information about a servo band ID in a reserved field in a longitudinal position (LPOS) word disposed therein.

12. The system according to claim 10, wherein at least four y-estimates are obtained from the readback servo signals per servo frame.

13. The system according to claim 12, wherein the computation of the y-estimates is independent of written-in velocity errors.

14. The system according to claim 12, wherein a most recent measure of a servo frame interval that is independent of written-in velocity errors is employed for the computation of the y-estimates.

15. The system according to claim 10, wherein at least two y-estimates are obtained from the readback servo signals per servo frame.

16. The system according to claim 15, wherein the computation of the y-estimates is independent of written-in velocity errors.

17. A servo pattern write head, comprising:
at least one yoke of ferromagnetic material;
at least one coil, to which current is applied, wrapped around a portion of the yoke to generate a magnetic flux therein; and
a tape-bearing portion of a housing into which the at least one yoke extends, including gaps through which the magnetic flux generated in the yoke extends, the gaps being arranged such that the magnetic flux is configured to simultaneously write a same one of a first or a second single servo pattern in respective servo bands with centerlines of the servo pattern of each of the servo bands being substantially uniformly spaced in the lateral direction, and where the respective servo pattern of all adjacent servo bands are displaced relative to each other in a longitudinal direction by one of a first or a second fraction of a length of a servo frame of the same one of the first or the second servo pattern, the first fraction being set in accordance with a type of the first servo pattern and the second fraction being set in accordance with a type of the second servo pattern and the fraction set for and a displacement of the first servo pattern being different from the fraction set for and a displacement of the second servo pattern.

18. A system, including the servo pattern write head of claim 17, and further comprising:
a magnetic recording medium, to which servo patterns are written by the servo write head, disposed proximate to the servo head; and
a controller, electrically coupled to the servo write head, which is configured to control the writing of the servo patterns to the magnetic recording medium.

19. The system according to claim 18 wherein the controller is configured to encode linear position (LPOS) information in the written servo patterns.

20. The system according to claim 19 wherein the controller is further configured to encode information about a servo band ID in a reserved field in a longitudinal position (LPOS) word disposed therein.

21. The system according to claim 18, wherein the controller is configured to control a timing of an application of current pulses to the at least one coil in the servo write head to achieve a desired longitudinal displacement of the servo patterns.

22. A method of writing a same one of a first or a second servo pattern in respective servo bands on linear magnetic tape, the method comprising:
spacing centerlines of the servo pattern of each of the servo bands substantially uniformly in a lateral direction; and
displacing the respective servo pattern of all adjacent servo bands relative to each other in a longitudinal direction by one of a first or a second fraction of a length of a servo frame of the same one of the first or the second servo pattern, the first fraction being set in accordance with a type of the first servo pattern and the second fraction being set in accordance with a type of the second servo pattern and being different from the first fraction such that the respective displacements of the first and second servo patterns are different.

* * * * *